United States Patent
Papageorgiou et al.

(10) Patent No.: US 10,505,823 B2
(45) Date of Patent: Dec. 10, 2019

(54) SYSTEM AND METHOD FOR ORCHESTRATING CONTROL ACTIONS OF THE ACCESS NETWORK LAYER, THE CORE NETWORK LAYER AND THE APPLICATION PLATFORM LAYER

(71) Applicant: NEC Europe Ltd., Heidelberg (DE)

(72) Inventors: Apostolos Papageorgiou, Heidelberg (DE); Ernoe Kovacs, Stuttgart (DE); Vasileios Karagiannis, Patras (GR); Seiichi Koizumi, Tokyo (JP); Shinya Ishida, Tokyo (JP); Takanori Iwai, Tokyo (JP); Akihito Kohiga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 344 days.

(21) Appl. No.: 15/455,166

(22) Filed: Mar. 10, 2017

(65) Prior Publication Data
US 2018/0262405 A1    Sep. 13, 2018

(51) Int. Cl.
*G06F 15/177* (2006.01)
*H04L 12/24* (2006.01)

(52) U.S. Cl.
CPC ...... *H04L 41/5025* (2013.01); *H04L 41/5006* (2013.01); *H04L 41/0816* (2013.01);
(Continued)

(58) Field of Classification Search
USPC .......... 709/220, 221, 238, 243, 244
See application file for complete search history.

(56) References Cited

U.S. PATENT DOCUMENTS

| 7,197,546 B1 * | 3/2007 | Bagga | H04L 41/0856 370/469 |
| 2003/0196118 A1 * | 10/2003 | Ushiki | H04L 29/06 713/152 |

(Continued)

OTHER PUBLICATIONS

D. King, et al., "A PCE-Based Architecture for Application-Based Network Operations", Internet Engineering Task Force (IETF), Mar. 2015, pp. 1-71.

(Continued)

*Primary Examiner* — Liang Che A Wang
(74) *Attorney, Agent, or Firm* — Leydig, Voit & Mayer, Ltd.

(57) ABSTRACT

A method of orchestrating control actions of controllers includes receiving requirements and, from each of an access network controller, a core network controller and an application platform controller, techniques of the respective controller, respective impacts of application of the techniques on the requirements and triggers addressable by the respective techniques. An initial synergy profile is generated using this information. In regular intervals or based on activation of a trigger, a handling procedure is run so as to identify techniques to be applied. The handling procedure considers the techniques and the respective impacts of application of the techniques an endangered requirement(s). Instructions to implement the respective identified techniques are sent to the respective belonging controllers. The synergy profile is updated based on changes resulting from the application of the techniques.

15 Claims, 3 Drawing Sheets

(52) U.S. Cl.
 CPC ...... *H04L 41/5045* (2013.01); *H04L 41/5051* (2013.01); *H04L 41/5096* (2013.01)

(56) References Cited

U.S. PATENT DOCUMENTS

| | | | | |
|---|---|---|---|---|
| 2014/0215499 | A1* | 7/2014 | Kawai | G06F 9/44536 |
| | | | | 719/328 |
| 2016/0366231 | A1* | 12/2016 | Xiao | H04L 67/14 |
| 2018/0260200 | A1* | 9/2018 | Karagiannis | G06F 8/60 |

OTHER PUBLICATIONS

Raul ;Munoz, et al., "Experimental Assessment of ABNO-based Network Orchestration of end-to-end Multi-layer(OPS/OCS) Provisioning across SDN/OpenFlow and GMPLS/PCE Control Domains", 2014 The European Conference on Optical Communication (ECOC), Cannes, Dec. 2014, pp. 1-3.

* cited by examiner

SYSTEM AND METHOD FOR ORCHESTRATING CONTROL ACTIONS OF THE ACCESS NETWORK LAYER, THE CORE NETWORK LAYER AND THE APPLICATION PLATFORM LAYER

FIELD

The present invention relates to the deployment of application components by an application platform and more particularly to a system and method for orchestrating the control actions of the access network layer, the core network layer and the application platform layer before and during such deployment.

BACKGROUND

Typically, large distributed applications are executed and managed by an application platform, which handles multiple applications. The application platform itself is installed in a distributed manner on the computing nodes that are available for running the applications and all of them run on top of a network. Application platforms are typically provided by Information Technology (IT) companies (e.g., Cloud providers), while the network is typically provided (and managed) by telecom operators. The network itself has diverse parts, e.g., the access network, which refers to the part from users/subscribers to the telecom operator's "central office", and the core network, which refers to the core networking services and the interne access. The scope and the technologies of these different parts are also very different.

Due to these considerations, there are typically three (or more) controllers, which belong to different domains and have no interaction with each other, although each controller usually has access to some information from the other layers (e.g., an application platform controller can get knowledge about the capacity of network links, etc.). The scope and the control parameters of each controller vary from system to system, but in general the application platform involves the control of deployment options and placement decisions of application components on the IT infrastructure. The core network involves the control of the composition and deployment of network service chains as well as the assignment of IT and network resources to domains and applications. The access network involves the control of network channels (e.g., radio) and parameters of networking equipment such as base stations in mobile networks or gateways in fixed networks.

Known approaches for application and/or network control either focus on how to enhance specific techniques of specific controllers, or suggest new architectures and technologies for connecting different controllers or modules of different layers. For example, D. King, A. Farrel, "A PCE-Based Architecture for Application-Based Network Operations", IETF RFC 7491, Mar. 2015 describe an Application-based Network Orchestration (ABNO), and R. Muñoz et al., "Experimental assessment of ABNO-based network orchestration of end-to-end multi-layer (OPS/OCS) provisioning across SDN/OpenFlow and GMPLS/PCE control domains," The European Conference on Optical Communication (ECOC), Cannes, pp. 1-3, 2014 describe solutions built on top of it, that connect part of the core network layer to other layers in order to optimize network service design and configuration in some aspects (which is one of the techniques of the core network controller). U.S. Pat. No. 7,197, 546 B1 describes an architecture of controllers for cooperatively forming a network design and configuration system.

SUMMARY

Embodiments of the present invention provide a system and a method for orchestrating the control actions of the access network layer, the core network layer and the application platform layer by interconnecting the three respective controllers thereof. Instead of merging the separate control cycles into a central controller, the actions of the controllers are orchestrated using an intermediate layer. With this arrangement, coordinated control can be achieved while still keeping the control cycles and their optimization solutions simple, thereby permitting to achieve higher satisfaction of Service Level Agreement (SLA) requirements.

In an embodiment, the present invention provides a method of orchestrating control actions of controllers. From an application platform controller, requirements of the application are received. From each of an access network controller, a core network controller and the application platform controller, techniques applicable to the respective controller, respective impacts of application of the techniques on the requirements and triggers applicable to the respective techniques are received. An initial synergy profile is generated using the information received from the controllers. In regular intervals or based on activation of one or more of the triggers of a respective one of the controllers, a handling procedure is run so as to identify respective ones of techniques to be applied. The handling procedure considers the techniques of each of the different controllers and the respective impacts of application of the techniques on one or more of the requirements that are endangered. Instructions to implement the respective identified techniques are sent to the respective controllers to which the techniques identified by the handling procedure belong, to implement the respective identified techniques. The synergy profile is updated based on changes resulting from the application of the techniques by the respective controllers.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
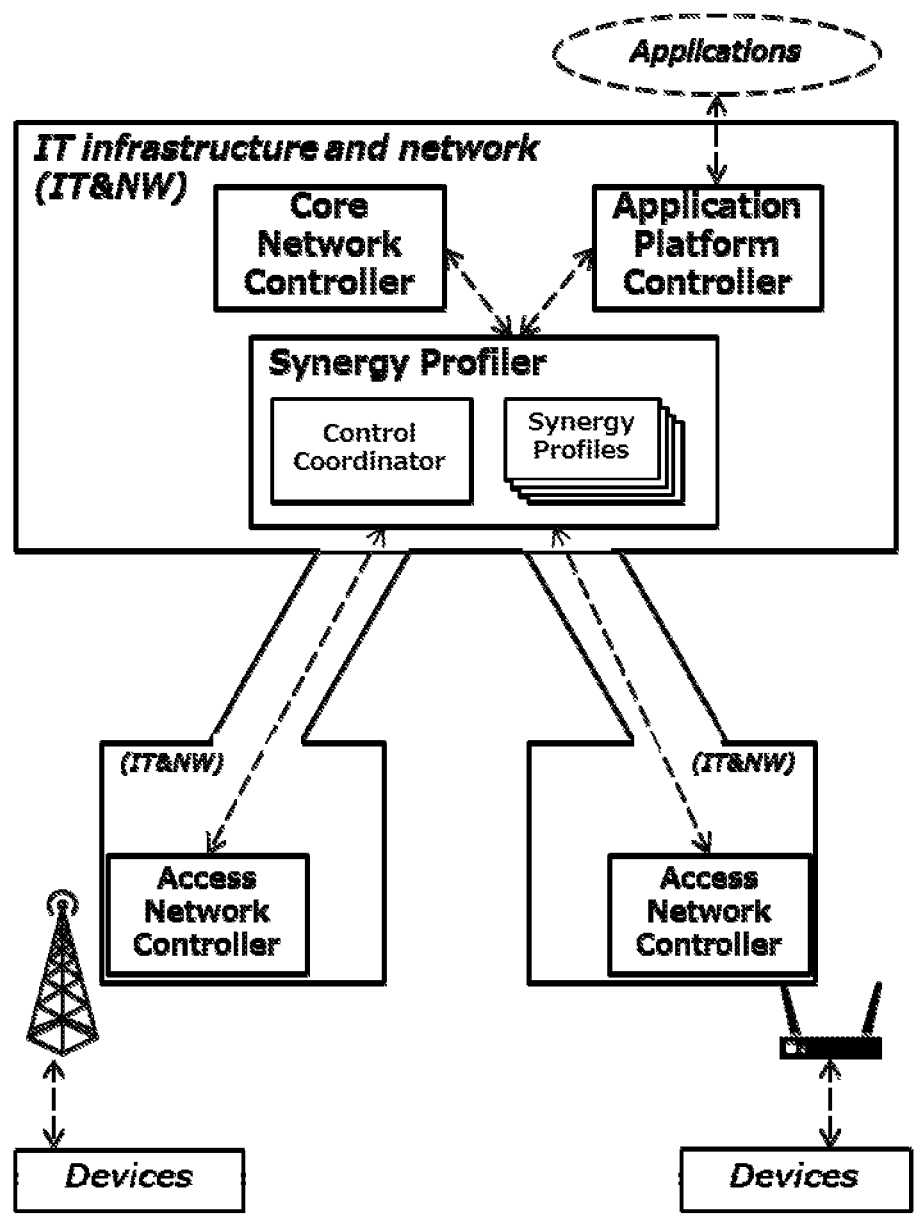
FIG. 1 is a system overview of a synergy layer in accordance with an embodiment of the present invention.

The inventors have recognized that a coordination among the controllers can be advantageous, for example, because the migration of an application component to the edge (i.e., close to the users it serves or the sensors and actuators that it controls) by the application platform controller would not be logical if the Network Functions Virtualization Orchestrator (NFVO) takes a parallel decision to run a Virtual Network Function (VNF, e.g., a firewall) in a remote Cloud, if this VNF belongs to the underlying network service chain. This is because the "remote" VNF will prevent achieving the desired latencies and the traffic will flow anyway via the remote Cloud. Additionally, the assignment of more bandwidth to a certain core network path by the core network controller in order to avoid the violation of a certain application requirement could also be illogical if the access network controller is already applying a local change to the base stations (e.g., different Radio Access Network (RAN) configuration or Quality of Service (QoS) prioritization of data flows) which would gradually lead to satisfaction of the same requirement. While the inventors recognize that abstraction and separation of concerns for the different controllers can be up to an extent positive, the inventors have also recognized that network virtualization and the opening of various functions of each layer to other layers through standardized Application Program Interfaces (APIs) create new opportunities, despite challenges, for the optimal functionality of the different controllers.

One solution to providing coordination among the controllers would be to provide for a central controller. However, the inventors found the following challenges to use of a central controller, which are also challenges to coordination of the controllers:

1. The application platform controller and the two other controllers belong to different providers, which are reluctant to connect or open their systems, owing to both technical and business reasons. The difficulties increase even further when the application platform runs on top of networks of multiple network service providers.

2. The application platform controller and the core network controller have time-wise longer control cycles than the access network controller, since changing their control parameters (e.g., application migration) is usually a heavy task which takes longer (usually various seconds) to complete, and involves costs in terms of system stabilization and computational complexity. On the contrary, the access network controller usually checks and reconfigures its parameters in cycles of a few milliseconds.

3. There are no existing standards or common approaches for capturing the conflicts, the relationships and the impacts on requirements that exist among the control actions that are available on each of the three (or more) controllers.

4. It is typical and desired that the different controllers have diverse and independently customizable optimization goals when they run their internal control cycles.

Additionally, the optimization problem of a centralized controller would contain so many control parameters (with dynamic, loose or unknown relationships and correlations) that an optimization problem involving all of the parameters would be difficult to design and inefficient in practice, especially for some applications.

In contrast to known approaches and the use of a central controller, embodiments of the present invention provide for alternatively applicable techniques of different layers or and selection and coordinated application among the layers according to requirements.

Referring to FIG. 1, according to an embodiment of the invention, a system is provided (the system being referred to generally herein as the "service layer") which includes the following components in an IT infrastructure and network (IT&NW):

1. An Application Platform Controller (APC), which receives packaged customer applications for deployment and can apply techniques such as (but not limited to):
   a. Application component replication and placement.
   b. Application component migration.
   c. Prioritization of applications or application requirements.
   d. Application data quality/quantity level configuration (if configurable).

2. A Core Network Controller (CNC), which can apply techniques such as (but not limited to):
   a. Assignment of a network slice (i.e., IT and network resources) to an application.
   b. Activation and de-activation of IT and networking equipment of the network .service provider.
   c. Composition and management of network service chains (i.e., instantiation and placement of VNFs).

3. An Access Network Controller (ANC), which can apply techniques such as (but not limited to):
   a. Configuration of RAN parameters.
   b. Assignment of radio channels to traffic types.
   c. Configuration of Gateway device parameters.

4. A Synergy Profiler (SP) which is used for the coordination of the controllers. It maintains synergy profiles that are created and used jointly by the controllers according to a specified synergy profile lifecycle. Further, the SP has a Control Coordinator component, which captures situations in which coordination is required and gives directives to the controllers according to its control coordination logic.

The controllers and the application components that are provided to the APC for deployment run on an IT and network infrastructure which is either entirely or partly controlled by the CNC. As shown in FIG. 1, typically the APC, the CNC, and the SP will run on backend servers in central offices or in the Cloud, while the ANC will run on mini data centers at the edge, i.e., close to the base stations it controls, but different deployments are possible. Each ANC can also control more than one base stations or gateways. All controllers can be executed either on one server or in a distributed fashion.

Figure 2:
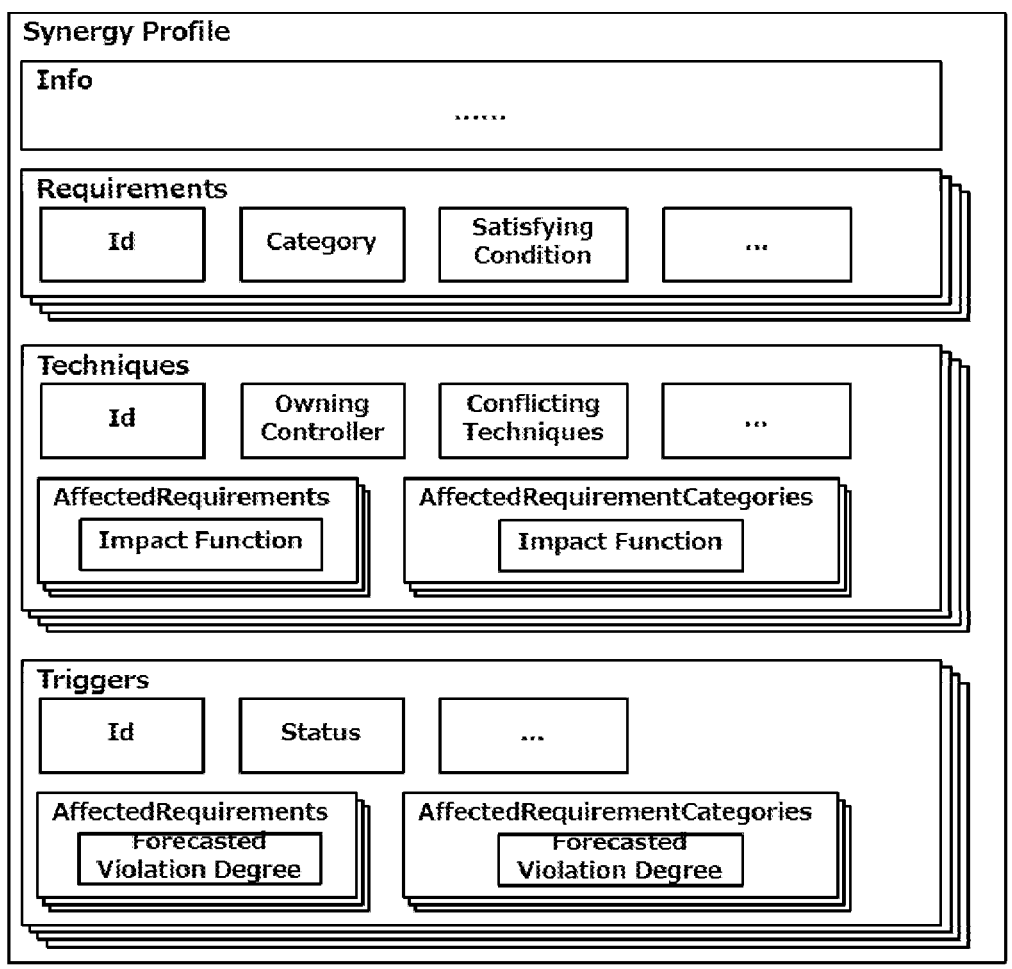
FIG. 2 shows a profile concept and model for the synergy layer.

In order to serve the described purpose of the SP, the synergy profiles are used jointly by the controllers and the SP according to the model shown in FIG. 2. This model represents the core concept of a synergy profile, according to an embodiment, and includes explicitly the entities that are relevant to the descriptions of the embodiments of the methods described herein. In practice, the synergy profiles may involve a much more complex structure and many additional elements, as the (still very simplified) example that is discussed further below already demonstrates. The core concept of the synergy profile can be implemented with different concrete technologies and/or data models (e.g., system components, databases, files), while a synergy profile can exist per system, per application group, per application or per application component. The core elements depicted in FIG. 2 are defined as follows:

1. "Info" contains information and parameters related to the deployed application components, the IT and network infrastructure and other relevant information. Parameters of "Info" can be provided by the controllers or by the SP based on their internal logic, which can vary. For example, the "IT and network infrastructure" refers to the "IT/NW slice" that the CNC reserves for this application when the application is provided for deployment. This can depend on an agreement with the customer, on an automated logic of the CNC (e.g., "cutting" a slice based on how many and how big the provided application components are, "cutting" a fixed-size slice for new applications, etc.). Therefore, when an application is provided for deployment, the APC "informs" the CNC (and the other controllers) about this by creating a synergy profile instance, the CNC sees that a new application needs to be deployed and therefore reserves a slice for it and writes the details of this slice into the synergy profile instance. Other parameters of "Info" part can include application and component names (which can be auto-generated by the SP), etc.

2. "Requirements" specify the details of various requirements of the application components. The APC contains a list of requirements associated with each component of each application. The lists can be provided, for example, by the designer of the application via an SLA, by the APC operator analyzing the application components and/or based on needs of the application provider. The requirements preferably are each identifiable by an id and belong to a "category" (e.g., bandwidth-related, latency-related, throughput-related, etc.), which enables to address the requirements in a group manner (i.e., not only individually) if required. Further, the requirements each have a specific numerical "satisfying condition", e.g., <50 ms. They also have other characteristics (e.g., sources, targets, etc.) which depend on the category of the requirement.

3. "Techniques" are the control actions that can be applied by controllers in order to satisfy requirements. The techniques provided above in the description of the controllers are applicable here and are listed in the synergy profile with a higher degree of granularity, e.g., "migrate component X to node Y" or "increase bandwidth assigned to network path L by Z MB/s." Each of the controllers therefore has a predefined set of techniques using their control parameters. Each technique preferably has an owning controller, a list of techniques (i.e., their id's) that have a conflict with this technique (i.e., they should not be applied together), as well as a formalized description of the impact of the technique on the requirements. The description can be structured as follows: If the technique knows that it can be used to satisfy concrete requirements, then an entry for each of these requirements is in the AffectedRequirements list, while there is also an AffectedRequirementsCategories list which holds information about the impact that the technique can have on all the requirements of a specified category (if this impact can be modeled in a way that applies to all the requirements of the same category). This is because it is typical for techniques to either help or do harm towards the satisfaction of similar requirements, e.g., a techniques that just assigns more bandwidth to an application tends to have positive impact on all bandwidth-related requirements of a certain application.

4. "Triggers" hold information and status parameters about situations (or events) that might demand the application of one or more techniques of any of the different controllers. For example, "the P-GW of Edge Site X is a throughput bottleneck (or stopped working)" can be a trigger. Possible reactions (i.e., techniques) for this trigger could be to i) add P-GW instances at that site, ii) change the application component deployment in a way that directs less traffic towards this P-GW, etc. Their "status" is set to true or false at runtime to indicate that the respective situation or event has occurred and handling might be required. The triggers also preferably maintain information about the AffectedRequirements and the AffectedRequirementCategories in a similar sense that the techniques do, i.e., the elements of the AffectedRequirements list are the requirements that are endangered by the occurred event and the "forecasted violation degree" will be also set by the reporting controller in order to allow the SP decide which techniques must be applied in order to solve the issue. The degree of the trigger is provided by the controller that sets the trigger. In the previous example ("the P-GW has become a bottleneck"), the ANC could report how many more packets over what it is able to handle the P-GW receives. Later, the SP can compare the trigger degree with the technique impact functions that have a positive impact on the requirements that are endangered by the trigger.

Figure 3:
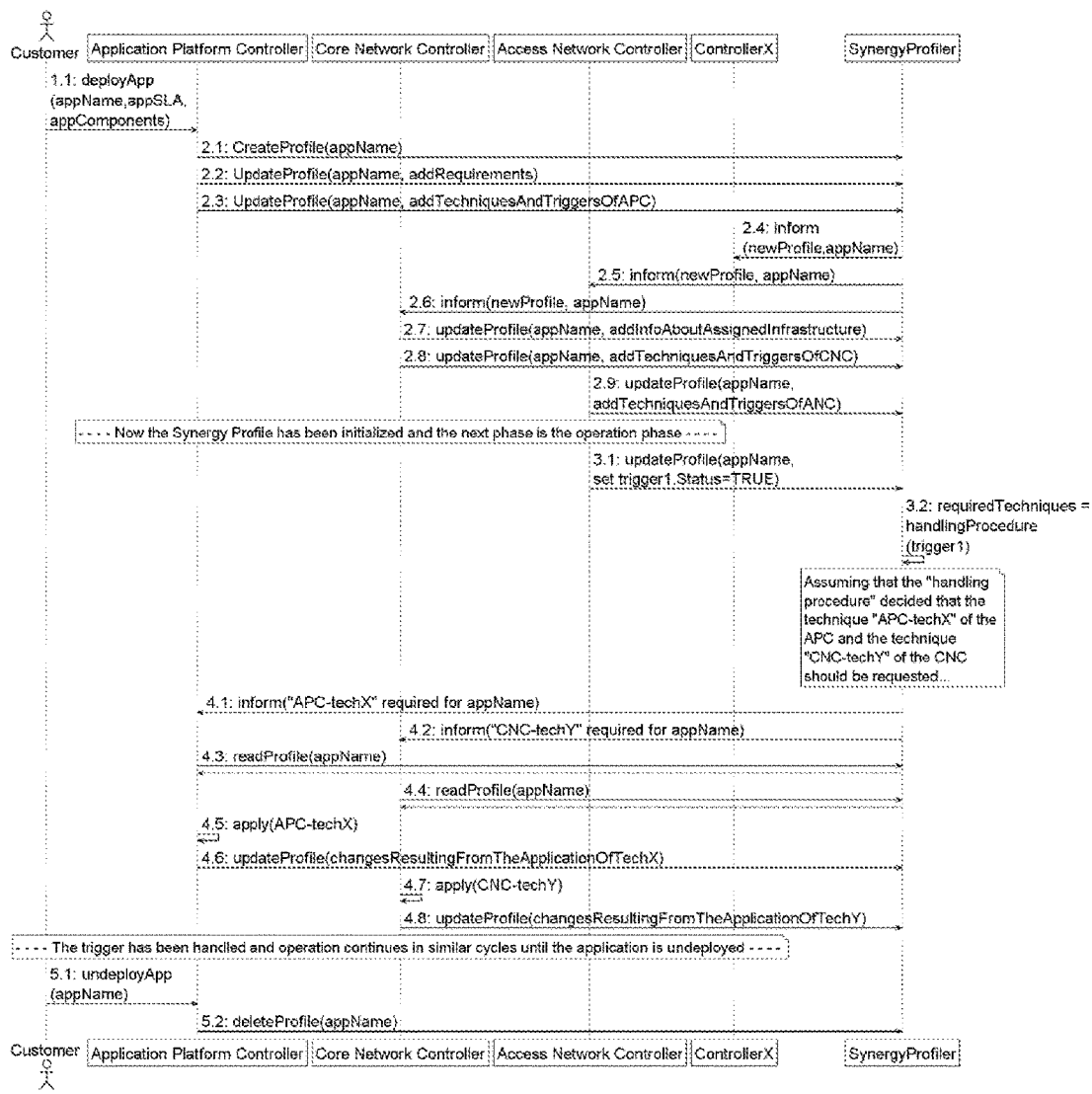
FIG. 3 shows a lifecycle of a synergy profile of a concrete application of the synergy layer.

The lifecycle of a synergy profile instance (i.e., the synergy profile of a concrete application) is shown as a Unified Modeling Language (UML) sequence diagram in FIG. 3. It contains five main phases:

1. The customer provides an application that shall be executed with multi-layer, synergy-based control to the APC (1.1: deployApp). The submitted package is provided with an application name (appName) and includes a package of deployable components (appComponents, e.g., VM images, containers, or executables) and optionally a simple SLA (appSLA).

2. The APC instructs the SP to create a new synergy profile instance (2.1: CreateProfile (appName)) and initializes the SP with information about the application components and their requirements (2.2: UpdateProfile (appName, addRequirements)). Further, the APC adds into the synergy profile instance the techniques that it can apply to satisfy the requirements of this application, as well as the triggers that it might activate at runtime (2.3: UpdateProfile (appName, addTechniquesAndTriggersOfAPC)). The SP informs the rest of the controllers about the newly instantiated synergy profile (2.4-2.6: inform (newProfile, appName)) and the controllers add their own techniques and triggers, as well as further parameters (2.7-2.9 updateProfile (appName, addInfoAboutAssignedInfrastructure or addTechniquesandTriggers [of CNC and/or CNC])). The CNC, for example, analyzes the information that had been added by the APC and assigns a slice (i.e., set of IT and network resources) to the application, which is also registered in the synergy profile instance.

3. Following phases 1 and 2, the initialization is complete and the operation phase begins. The triggers are set and the techniques can be applied as reactions to them in a loop that runs as long as the application is running. During the operation phase, controllers perform irregular updates to the synergy profile if they change important synergy-related parameters within their internal cycles. Using the IT/NW infrastructure slice example above, the CNC could require more resources for a critical application such that the resources reserved for another application would need to be used. In this case, the CNC updates the "Infrastructure" part of the synergy profile. The controllers set the status of a trigger to true when they identify that one or more of the requirements are endangered (3.1: updateProfile (appNAME, set trigger1.Status=TRUE)). Either in regular intervals or upon the activation of one or more triggers, the SP runs its "handling procedure", i.e., its Control Coordinator logic (3.2: requiredTechniques=handlingProcedure (trigger1)). The baseline algorithm of the Control Coordinator and its potential extensions are described below.

4. As soon as the SP has executed its handling procedure, and identified a set of techniques that must be requested from the controllers (techniques APC-techX and CNC-techY are named as examples in FIG. 3), the SP informs the owning controllers of the selected techniques about the situation and its request to them (4.1: inform ("APC-techX" required for appName) and 4.2: inform ("CNC-techY" required for appName)). If possible, the controllers apply the techniques with the inputs and to the degree that it is requested, and subsequently update the synergy profile instance respectively (4.3 and 4.4: readProfile (appName), 4.5 and 4.7: apply (APC-techX or CNC-techY) and 4.6 and 4.8: updateProfile (changesResultingFromTheApplication [of TechX or TechY])). The cycle of phases 3 and 4 is repeated (for different triggers and techniques) for the lifetime of the synergy profile instance.

5. The customer requests undeployment of the application when no synergy-based execution is further required and the APC undeploys the components and deletes the respective synergy profile instance (5.1: undeployApp (appName) and 5.2: deleteProfile (appName)).

The following Listing 1 shows a simplified example of parameters of a synergy profile instance, which captures an application with two components, a VNF component, an infrastructure slice with three sites (one Cloud site and two edge sites) and the links between them that are assigned to the application, three available techniques for satisfying the requirements of the components, and two triggers that can be activated by any controller (namely by setting SynergyProfile.Control.Trigger.*.Status to true) to indicate that a requirement (i.e., "SynergyProfile.Component.1.Requirements.Bandwidth Req.1") is endangered. The SP would then evaluate the impact functions of the available techniques on this requirement and decide to request one or more of them. In the example, these functions are represented as strings, depending on a factor, i.e., degree to which the trigger or the technique are activated (or applied). In a more simplified way, the impact functions could be represented as "contributions" in the standard User Requirements Notation (URN) of the International Telecommunication Union Telecommunication Standardization Sector (ITU-T), which can have one of the values "Make", "Help", "SomePositive", "Unknown", "SomeNegative", "Break" or "Hurt". Various other aspects of the complete model, template, and schema used for creating synergy profile instances can be used as desired within the scope of embodiments of the present invention.

Listing 1: Simplified synergy profile instance example parameters

```
SynergyProfile.ProfileName = "VideoSurveillanceProfile"
SynergyProfile.ApplicationName = "VideoSurveillance"
SynergyProfile.Component.1.Name = "CameraReader"
SynergyProfile.Component.1.ComponentType = "AppExecutable"
SynergyProfile.Component.1.DeploymentTechnology = "VM"
SynergyProfile.Component.1.NumberOfThreads = 3
SynergyProfile.Component.1.Requirements.MinHostCPU = 1000
SynergyProfile.Component.1.Requirements.MinHostRAM = 500
SynergyProfile.Component.1.Requirements.TimeReq.1.Target = "null"
SynergyProfile.Component.1.Requirements.TimeReq.1.Type = "Latency"
SynergyProfile.Component.1.Requirements.TimeReq.1.ReqAvgTime = 50
SynergyProfile.Component.1.Requirements.BandwidthReq.1.Target = "VideoAnalyzer"
SynergyProfile.Component.1.Requirements.BandwidthReq.1.MinAllowedBandwidth = 15000
SynergyProfile.Component.2.Name = "VideoAnalyzer"
SynergyProfile.Component.2.ComponentType = "AppExecutable"
SynergyProfile.Component.2.DeploymentTechnology = "VM"
SynergyProfile.Component.2.NumberOfThreads = 10
SynergyProfile.Component.2.Requirements.MinHostCPU = 1500
SynergyProfile.Component.2.Requirements.MinHostRAM = 1000
SynergyProfile.Component.2.Requirements.TimeReq.1.Target = "CameraReader"
SynergyProfile.Component.2.Requirements.TimeReq.1.Type = "Latency"
SynergyProfile.Component.2.Requirements.TimeReq.1.ReqAvgTime = 100
SynergyProfile.Component.3.Name = "Virtual-P-GW"
SynergyProfile.Component.3.ComponentType = "VNF"
SynergyProfile.Component.3.DeploymentTechnology = "VM"
SynergyProfile.Component.3.NumberOfThreads = 1
SynergyProfile.Component.3.Requirements.ThroughputReq.1.Name = "PacketsPerSecondCapacity"
SynergyProfile.Component.3.Requirements.ThroughputReq.1.MaxThroughput = 1000
SynergyProfile.Component.3.Requirements.ThroughputReq.1.ThroughputUnit = "Packets"
SynergyProfile.Infrastructure.RelatedPoP.1.Name = "MyCloudSite1"
SynergyProfile.Infrastructure.RelatedPoP.1.Location = "Tokyo"
SynergyProfile.Infrastructure.RelatedPoP.1.AdministrativeDomain = "Telco1"
SynergyProfile.Infrastructure.RelatedPoP.1.Type = "Cloud"
SynergyProfile.Infrastructure.RelatedPoP.1.Host.1.Name = "MyCloudServer1"
SynergyProfile.Infrastructure.RelatedPoP.1.Host.1.Processor.Architecture = "x86_64"
SynergyProfile.Infrastructure.RelatedPoP.1.Host.1.Processor.NumOfCores = 4
SynergyProfile.Infrastructure.RelatedPoP.1.Host.1.Processor.Speed = 3500
SynergyProfile.Infrastructure.RelatedPoP.1.Host.1.Processor.RAM = 12000
SynergyProfile.Infrastructure.RelatedPoP.1.Host.2.Name = "MyCloudServer2"
SynergyProfile.Infrastructure.RelatedPoP.1.Host.2.Processor.Architecture = "x86_64"
SynergyProfile.Infrastructure.RelatedPoP.1.Host.2.Processor.NumOfCores = 4
SynergyProfile.Infrastructure.RelatedPoP.1.Host.2.Processor.Speed = 3500
SynergyProfile.Infrastructure.RelatedPoP.1.Host.2.Processor.RAM = 12000
SynergyProfile.Infrastructure.RelatedPoP.2.Name = "MyEdgeSite1"
SynergyProfile.Infrastructure.RelatedPoP.2.Location = "Tamagawa"
SynergyProfile.Infrastructure.RelatedPoP.2.AdministrativeDomain = "Telco2"
SynergyProfile.Infrastructure.RelatedPoP.2.Type = "Edge"
SynergyProfile.Infrastructure.RelatedPoP.2.Host.1.Name = "MyEdgeServer1"
SynergyProfile.Infrastructure.RelatedPoP.2.Host.1.Processor.Architecture = "x86_64"
SynergyProfile.Infrastructure.RelatedPoP.2.Host.1.Processor.NumOfCores = 1
SynergyProfile.Infrastructure.RelatedPoP.2.Host.1.Processor.Speed = 3000
SynergyProfile.Infrastructure.RelatedPoP.2.Host.1.Processor.RAM = 4000
SynergyProfile.Infrastructure.RelatedPoP.3.Name = "MyEdgeSite2"
SynergyProfile.Infrastructure.RelatedPoP.3.Location = "Ueno"
```

Listing 1: Simplified synergy profile instance example parameters

```
SynergyProfile.Infrastructure.RelatedPoP.3.AdministrativeDomain = "Telco2"
SynergyProfile.Infrastructure.RelatedPoP.3.Type = "Edge"
SynergyProfile.Infrastructure.RelatedPoP.3.Host.1.Name = "MyEdgeServer2"
SynergyProfile.Infrastructure.RelatedPoP.3.Host.1.Processor.Architecture = "x86_64"
SynergyProfile.Infrastructure.RelatedPoP.3.Host.1.Processor.NumOfCores = 1
SynergyProfile.Infrastructure.RelatedPoP.3.Host.1.Processor.Speed = 2000
SynergyProfile.Infrastructure.RelatedPoP.3.Host.1.Processor.RAM = 2000
SynergyProfile.Infrastructure.RelatedPoP.Link.1.OriginPoP = "MyEdgeSite1"
SynergyProfile.Infrastructure.RelatedPoP.Link.1.DestinationPoP = "MyCloudSite1"
SynergyProfile.Infrastructure.RelatedPoP.Link.1.Latency = 70
SynergyProfile.Infrastructure.RelatedPoP.Link.1.Bandwidth = 54000
SynergyProfile.Infrastructure.RelatedPoP.Link.2.OriginPoP = "MyCloudSite1"
SynergyProfile.Infrastructure.RelatedPoP.Link.2.DestinationPoP = "MyEdgeSite1"
SynergyProfile.Infrastructure.RelatedPoP.Link.2.Latency = 70
SynergyProfile.Infrastructure.RelatedPoP.Link.2.Bandwidth = 54000
SynergyProfile.Infrastructure.RelatedPoP.Link.3.OriginPoP = "MyEdgeSite2"
SynergyProfile.Infrastructure.RelatedPoP.Link.3.DestinationPoP = "MyCloudSite1"
SynergyProfile.Infrastructure.RelatedPoP.Link.3.Latency = 70
SynergyProfile.Infrastructure.RelatedPoP.Link.3.Bandwidth = 54000
SynergyProfile.Infrastructure.RelatedPoP.Link.4.OriginPoP = "MyCloudSite1"
SynergyProfile.Infrastructure.RelatedPoP.Link.4.DestinationPoP = "MyEdgeSite2"
SynergyProfile.Infrastructure.RelatedPoP.Link.4.Latency = 70
SynergyProfile.Infrastructure.RelatedPoP.Link.4.Bandwidth = 54000
SynergyProfile.Infrastructure.RelatedPoP.Link.5.OriginPoP = "MyEdgeSite1"
SynergyProfile.Infrastructure.RelatedPoP.Link.5.DestinationPoP = "MyEdgeSite2"
SynergyProfile.Infrastructure.RelatedPoP.Link.5.Latency = 100
SynergyProfile.Infrastructure.RelatedPoP.Link.5.Bandwidth = 24000
SynergyProfile.Infrastructure.RelatedPoP.Link.6.OriginPoP = "MyEdgeSite2"
SynergyProfile.Infrastructure.RelatedPoP.Link.6.DestinationPoP = "MyEdgeSite1"
SynergyProfile.Infrastructure.RelatedPoP.Link.6.Latency = 100
SynergyProfile.Infrastructure.RelatedPoP.Link.6.Bandwidth = 24000
SynergyProfile.Control.NumOfControllers = 4
SynergyProfile.Control.Controller.1.Name = "ECO"
SynergyProfile.Control.Controller.1.ControlLayer = "ApplicationPlatform"
SynergyProfile.Control.Controller.2.Name = "NFVO"
SynergyProfile.Control.Controller.2.ControlLayer = "CoreNW"
SynergyProfile.Control.Controller.3.Name = "CAC1"
SynergyProfile.Control.Controller.3.ControlLayer = "AccessNW"
SynergyProfile.Control.Controller.3.RelatedPoP = "MyEdgeSite1"
SynergyProfile.Control.Controller.3.Capacity = 5000
SynergyProfile.Control.Controller.4.Name = "CAC2"
SynergyProfile.Control.Controller.4.ControlLayer = "AccessNW"
SynergyProfile.Control.Controller.4.RelatedPoP = "MyEdgeSite2"
SynergyProfile.Control.Controller.4.Capacity = 5000
SynergyProfile.Control.Technique.1.Name = "ReplicateAppExecutableInCloud"
SynergyProfile.Control.Technique.1.OwningController = "ECO"
SynergyProfile.Control.Technique.1.RelatedComponent = "VideoAnalyzer"
SynergyProfile.Control.Technique.1.RequiredTime = "3000 * sqrt(x)"
SynergyProfile.Control.Technique.1.Requested = false
SynergyProfile.Control.Technique.1.Factor = 0
SynergyProfile.Control.Technique.1.AffectedRequirement.1.IsGeneric = false
SynergyProfile.Control.Technique.1.AffectedRequirement.1.Name =
"SynergyProfile.Component.1.Requirements.BandwidthReq.1."
SynergyProfile.Control.Technique.1.AffectedRequirement.1.URNDependency =
"SomePositive"
SynergyProfile.Control.Technique.1.AffectedRequirement.1.ImpactFunction = "2 * sqrt(x)"
SynergyProfile.Control.Technique.2.Name = "IncreaseBandwidth"
SynergyProfile.Control.Technique.2.OwningController = "NFVO"
SynergyProfile.Control.Technique.2.RelatedLink = "MyEdgeSite1, MyEdgeSite2"
SynergyProfile.Control.Technique.2.RequiredTime = "1000"
SynergyProfile.Control.Technique.2.Requested = false
SynergyProfile.Control.Technique.2.Factor = 0
SynergyProfile.Control.Technique.2.AffectedRequirement.1.IsGeneric = false
SynergyProfile.Control.Technique.2.AffectedRequirement.1.Name =
"SynergyProfile.Component.1.Requirements.BandwidthReq.1."
SynergyProfile.Control.Technique.2.AffectedRequirement.1.URNDependency =
"SomePositive"
SynergyProfile.Control.Technique.2.AffectedRequirement.1.ImpactFunction = "x"
SynergyProfile.Control.Technique.3.Name = "ReplicateVNF"
SynergyProfile.Control.Technique.3.OwningController = "NFVO"
SynergyProfile.Control.Technique.3.RelatedComponent = "Virtual-P-GW"
SynergyProfile.Control.Technique.3.RelatedHost = "MyEdgeSite2"
SynergyProfile.Control.Technique.3.RequiredTime = "3000 * sqrt(x)"
SynergyProfile.Control.Technique.3.Requested = false
SynergyProfile.Control.Technique.3.Factor = 0
SynergyProfile.Control.Technique.3.AffectedRequirement.1.IsGeneric = false
SynergyProfile.Control.Technique.3.AffectedRequirement.1.Name =
```

Listing 1: Simplified synergy profile instance example parameters

```
"SynergyProfile.Component.3.Requirements.ThroughputReq.1."
SynergyProfile.Control.Technique.3.AffectedRequirement.1.URNDependency =
"SomePositive"
SynergyProfile.Control.Technique.3.AffectedRequirement.1.ImpactFunction = "x"
SynergyProfile.Control.Trigger.1.Name = "InterEdgeBandwidthBottleneck"
SynergyProfile.Control.Trigger.1.Status = false
SynergyProfile.Control.Trigger.1.RelatedLink = "MyEdgeSite1, MyEdgeSite2"
SynergyProfile.Control.Trigger.1.Factor = 0
SynergyProfile.Control.Trigger.1.ViolatedRequirement.1.IsGeneric = false
SynergyProfile.Control.Trigger.1.ViolatedRequirement.1.Name =
"SynergyProfile.Component.1.Requirements.BandwidthReq.1."
SynergyProfile.Control.Trigger.1.ViolatedRequirement.1.DegreeOfViolation = "x"
SynergyProfile.Control.Trigger.1.ViolatedRequirement.1.TypeOfViolation = "Measured"
SynergyProfile.Control.Trigger.2.Name = "3GPPPacketsBottleneck"
SynergyProfile.Control.Trigger.2.Status = false
SynergyProfile.Control.Trigger.2.RelatedComponent = "Virtual-P-GW"
SynergyProfile.Control.Trigger.2.RelatedHost = "Undefined"
SynergyProfile.Control.Trigger.2.Factor = 0
SynergyProfile.Control.Trigger.2.ViolatedRequirement.1.IsGeneric = false
SynergyProfile.Control.Trigger.2.ViolatedRequirement.1.Name =
"SynergyProfile.Component.3.Requirements.ThroughputReq.1."
SynergyProfile.Control.Trigger.2.ViolatedRequirement.1.DegreeOfViolation = "0.001 * x"
SynergyProfile.Control.Trigger.2.ViolatedRequirement.1.TypeOfViolation = "Expected"
```

Regarding the Control Coordinator logic, there are variations of the logic that the SP can use in order to decide which techniques shall be requested as a response to the activation of one or more triggers (see step 3.2 in FIG. 3). In particular, Listing 2 below specifies the baseline algorithm, which can be extended as indicated in the respective comments in order embody any kind of utility function and optimization problem solving technique for finding the final "optimal techniques combination." According to an embodiment, the logic provides for the following steps:
1. Find all endangered requirements by iterating through the triggers that have been activated and examining which requirements and requirements categories that are potentially affected, finding subsequently all the requirements of this application that belong to these categories.
2. Find all techniques that have a positive impact to any of the endangered requirements or to any requirements category to which any of the endangered requirements belongs.
3. Among the previously found techniques, mark as indisputable those that have no negative impact to any of the endangered requirements and no conflicts to any of the other techniques of the list.
4. For the remaining (disputable) techniques, set up and solve an instance of the Optimal Subset Selection problem using a custom utility function whose variables can be read from the synergy profile instance (see also the comments below embedded in the pseudocode).
5. Return the set of the indisputable techniques plus the selected disputable techniques to be requested by the SP from the respective controllers.

In the example, the loops in the pseudocode are not optimized in terms of performance, but rather the opposite, they tend to apply brute force iterations and be completely separated from other loops that have different purpose, in order to increase readability and better explain the logic. In other embodiments, the loops can be optimized.

Listing 2: Baseline algorithm of the SP Control Coordinator logic

```
// Description: This is the baseline algorithm for selecting a combination of techniques that
the SP will request from the controllers to apply. It can be run either periodically or upon the
activation of a certain number of triggers (potentially also one).
// Input: Synergy Profile instance
// Output: List of selected controller techniques
List endangeredRequirements;
// 1
for each trigger in Synergy Profile instance
    if (trigger, status = true)
        for each affectedRequirement in trigger.AffectedRequirements
            if (affectedRequirement not in endangeredRequirements)
                endangeredRequirements.add(affectedRequirement);
            end if
        end for
        for each affectedRequirementCategory in trigger.AffectedRequirementCategories
            for each requirement in Synergy Profile instance
                if (requirement. Category = affectedRequirementCategory)
                    if (requirement not in endangeredRequirements)
                        endangeredRequirements.add(requirement);
                    end if
                end if
            end for
        end for
    end if
end for
```

Listing 2: Baseline algorithm of the SP Control Coordinator logic

```
List relevantTechniques;
// 2
for each technique in Synergy Profile instance
   for each endangeredRequirement in endangeredRequirements
      for each requirement in technique.AffectedRequirements
         if (requirement = endangeredRequirement)
            if (requirement.ImpactFunction = positive)
               relevantTechniques.add(technique)
               go to LABEL1;
            end if
         end if
      end for
      for each affectedRequirementCategory in technique.AffectedRequirementCategories
         if (requirement.Category = affectedRequirementCategory)
            if (affectedRequirementCategory.ImpactFunction = positive)
               relevantTechniques.add(technique)
               go to LABEL1;
            end if
         end if
      end for
   end for
   LABEL1;
end for
List indisputableTechniques = relevantTechniques;
List disputableTechniques;
// 3
for each technique in indisputableTechniques
   for each conflictingTechnique in conflictingTechniques
      if (conflictingTechnique in relevantTechniques)
         disputableTechniques.add(technique);
         disputableTechniques.add(conflictingTechnique);
         indisputableTechniques.remove(technique);
         indisputableTechniques.remove(conflictingTechnique);
         go to LABEL2;
      end if
   end for
   for each endangeredRequirement in endangeredRequirements
      for each requirement in technique.AffectedRequirements
         if (requirement = endangeredRequirement)
            if (requirement.ImpactFunction = negative)
               disputableTechniques.add(technique);
               disputableTechniques.add(conflictingTechnique);
               indisputableTechniques.remove(technique);
               indisputableTechniques.remove(conflictingTechnique);
               go to LABEL2;
            end if
         end if
      end for
      for each affectedRequirementCategory in technique.AffectedRequirementCategories
         if (requirement.Category = affectedRequirementCategory)
            if (affectedRequirementCategory.ImpactFunction = negative)
               disputableTechniques.add(technique);
               disputableTechniques.add(conflictingTechnique);
               indisputableTechniques.remove(technique);
               indisputableTechniques.remove(conflictingTechnique);
               go to LABEL2;
            end if
         end if
      end for
   end for
   LABEL2;
end for
Integer numberOfDisputableTechniques = sizeof(disputableTechniques);
Integer numberOfDisputableTechniqueCombinations = 2 ^ numberOfDisputableTechniques;
// 4
Integer currentUtility = 0;
Integer i = 0;
peferredCombination = none;
while (i < numberOfDisputableTechniqueCombinations)
   Integer u = computeUtilityOfCombination(i);***
   if (u > currentUtility)
      preferredCombination = i;
   end if
end while
// 5
List selectedDisputableTechniques = techniques of preferredCombination;
List techniquesToBeRequested = indisputableTechniques + selectedDisputableTechniques;
```

Listing 2: Baseline algorithm of the SP Control Coordinator logic

```
return techniquesToBeRequested;
*** computeUtilityOfCombination(i) is a function that assigns a utility value to the i-th
combination of techniques. In this case, "i" plays the role of the "selection variable" of the
optimization problem. For example, if numberOfDisputableTechniques=3, i.e.,
numberOfDisputableTechniqueCombinations=8, then i takes the values from 0 to 7, with the
bits of its binary representation indicating which techniques are selected in the respective
combination, e.g., for i=3 (=011 in binary representation), the first and the second disputable
techniques are selected (because the respective bits, from right to left, are "set", i.e., have the
value 1), while the third technique is not selected. The combination with the higher utility
will be selected and its techniques will be added to the indisputable techniques to form a final
set of techniques selected for application. It is exactly this utility function that can be altered
or varied in order to apply any kind of optimization logic the operator wants to apply. The
utility function will be based on the impact functions and other parameters of the synergy
profile, but those can be combined, weighed, and enriched with other system parameters in
any number of ways, in order to create any custom utility function as desired. Also, in this
case, the pseudocode hints towards a brute force solution of the optimization problem, but of
course a kind of solver or heuristic is preferably used since the Optimal Subset Selection
problem is Non-deterministic Polynomial-time Hard (NP-Hard).
```

According to embodiments, the present invention provides for the following advantages:
1. The coordinated combination of orchestration techniques of controllers of different layers, based on an additional layer which includes formalized, homogeneous and dynamic information about the application requirements, the cooperating controllers, the techniques that the controllers can apply, the quantified impact of those techniques on the requirements, the requirements satisfaction status, etc. This directly results in reduced requirements violations and more effective deployment of application components, as discussed below.
2. Use of the aforementioned information by a coordinating component (SP) in order to compute optimal subsets of techniques (each of them with customizable input parameters) that can be requested from the controllers in order to avoid violations of requirements.
3. Reduction in the frequency of (SLA) requirements violations, or elimination thereof entirely. This, in particular, is considered to be a substantial improvement to the functioning of the computer system including the three network controllers, the APC, the CNC, the ANC and any additional controllers. By utilizing the inventive orchestration among the controllers, violations which would otherwise occur using the known approaches can be avoided and the application can be deployed and run more effectively.
4. Incentivizes customers to choose the telecom operator for hosting their applications, because they will be the only ones who can execute the application with the described coordinated control, thereby providing incentives and advantages for the operators.
5. As opposed to use of a central controller, increase flexibility in coordinating control actions while allowing for specialized and different functioning and optimization goals of the individual controllers. This permits the controllers to maintain some of their individual goals and techniques, while violations are nevertheless reduced.

According to an embodiment of the present invention, a method for orchestrating the control actions of the access network layer, the core network layer and the application platform layer comprises the steps of:
1. Provision that an APC, a CNC and an ANC are connected to the same SP, to which they register application requirements, their available management techniques, the quantified impact of the application of those techniques on the existing requirements, possible control triggers, and other dynamic system information, all together comprising synergy profile instances (one instance for each application).
2. Submission of applications (i.e., its deployable components and its SLA) from the customers to the APC.
3. Generation of an initial synergy profile instance for each application by the APC based on its components and the SLA.
4. Assignment of a network slice (IT and network resources) from the core network controller to this application and respective update of the synergy profile instance.
5. Registration of the techniques and their impacts on the requirements by all the involved controllers in the synergy profile instance. Registration of triggers (situations) that might require the application of a subset of techniques of the involved controllers, together with the relationship of those triggers to the requirements.
6. Central handling (i.e., by the SP) of the activation of triggers (either periodically or upon the activation of a number of triggers) via a handling procedure which selects a combination of techniques which can be applied in order to satisfy the requirements that are endangered by the trigger, performing the selection based on interrelating the forecasted violation degree of the requirement and the quantified impacts of the available techniques on the same requirements.
7. Request for (parameterized) enforcement of these techniques.

In an embodiment, the application platform can be an Internet of Things (IoT) platform and the method and system can be used as a differentiator of the service enabler product of the IoT platform, or as a separate product.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of orchestrating control actions of controllers, the method comprising:
   receiving, from an application platform controller, requirements of an application;
   receiving, from each of an access network controller, a core network controller and the application platform controller, respective techniques of the respective controllers, respective impacts of use of the respective techniques on the requirements and triggers addressable by the respective techniques, the triggers having information about situations or events that result in at least one of the requirements being endangered;
   generating an initial synergy profile using the respective techniques, the respective impacts of the use of the respective techniques and the triggers received from the controllers;
   running, in regular intervals or based on activation of one or more of the triggers, a handling procedure which considers the respective techniques of each of the different controllers and the respective impacts of the use of the respective techniques to identify which ones of the techniques are to be implemented to address one or more of the requirements that are indicated by the information of an activated one of the triggers as being endangered;
   sending instructions, to the respective controllers to which the techniques identified by the handling procedure belong, to implement the respective identified techniques; and
   updating the synergy profile based on changes resulting from the application of the techniques by the respective controllers.

2. The method according to claim 1, further comprising implementing, by the respective controllers, the respective identified techniques.

3. The method according to claim 1, further comprising receiving updates from the controllers upon a change in a parameter during internal cycles of the respective controllers that run during an operation phase of the application, wherein the steps of running the handling procedure, sending the instructions and updating the synergy profile are performed each time one of the triggers is activated.

4. The method according to claim 1, wherein the handling procedure includes the steps of:
   determining the one or more requirements that are endangered using the information received from the controllers and contained in the synergy profile;
   locating the techniques that have a positive impact on the one or more requirements that are endangered;
   determining whether any of the located techniques would have conflicts with each other; and
   identifying the located techniques that have the positive impact and no conflicts as the respective ones of techniques to be applied.

5. The method according to claim 4, wherein the handling procedure further includes the steps of:
   determining whether any of the located techniques would also have a negative impact on the one or more requirements that are endangered;
   identifying the located techniques that would have the negative impact or the conflict with another one of the located techniques as disputable techniques; and
   selecting a subset of the disputable techniques to be identified with the located techniques that have the positive impact and no conflicts as the respective ones of techniques to be applied.

6. The method according to claim 4, wherein:
   the requirements are organized by requirements categories in the synergy profile;
   the one or more requirements that are endangered are determined based on a respective one of the requirements categories which is affected by the one or more activated triggers; and
   the handling procedure considers the positive impact of the techniques to the respective one of the requirements categories to which any of the one or more requirements that are endangered belong.

7. The method according to claim 1, wherein the steps are performed by a server which temporarily stores the synergy profile in memory and updates the synergy profile until the application is undeployed.

8. The method according to claim 1, wherein the instructions include a factor informing the respective controllers an extent to which the respective identified techniques are to be applied.

9. A synergy profiler including one or more computational processors, which alone or in combination, are configured to orchestrate control actions of controllers by:
   receiving, from an application platform controller, requirements of an application;
   receiving, from each of an access network controller, a core network controller and the application platform controller, respective techniques of the respective controller, respective impacts of use of the respective techniques on the requirements and triggers addressable by the respective techniques, the triggers having information about situations or events that result in at least one of the requirements being endangered;
   generating an initial synergy profile using the respective techniques, the respective impacts of the use of the respective techniques and the triggers received from the controllers;
   running, in regular intervals or based on activation of one or more of the triggers, a handling procedure which considers the respective techniques of each of the different controllers and the respective impacts of the use of the respective techniques to identify which ones of the techniques are to implemented to address one or more of the requirements that are indicated by the information of an activated one of the triggers as being endangered;
   sending instructions, to the respective controllers to which the techniques identified by the handling procedure belong, to implement the respective identified techniques; and
   updating the synergy profile based on changes resulting from the application of the techniques by the respective controllers.

10. The synergy profiler according to claim 9, wherein synergy profiler is configured for receiving updates from the controllers upon a change in a parameter during internal cycles of the respective controllers that run during an operation phase of the application, and, based thereon, performs the steps of running the handling procedure, sending the instructions and updating the synergy profile each time one of the triggers is activated.

11. The synergy profiler according to claim 9, wherein the handling procedure includes the steps of:
- determining the one or more requirements that are endangered using the information received from the controllers and contained in the synergy profile;
- locating the techniques that have a positive impact on the one or more requirements that are endangered;
- determining whether any of the located techniques would have conflicts with each other; and
- identifying the located techniques that have the positive impact and no conflicts as the respective ones of techniques to be applied.

12. The synergy profiler according to claim 11, wherein the handling procedure further includes the steps of:
- determining whether any of the located techniques would also have a negative impact on the one or more requirements that are endangered;
- identifying the located techniques that would have the negative impact or the conflict with another one of the located techniques as disputable techniques; and
- selecting a subset of the disputable techniques to be identified with the located techniques that have the positive impact and no conflicts as the respective ones of techniques to be applied.

13. The synergy profiler according to claim 11, wherein the synergy profiler is configured to:
- organize the requirements by requirements categories in the synergy profile;
- determine the one or more requirements that are endangered based on a respective one of the requirements categories which is affected by the one or more activated triggers; and
- consider, in the handling procedure, the positive impact of the techniques to the respective one of the requirements categories to which any of the one or more requirements that are endangered belong.

14. The synergy profiler according to claim 9, wherein the instructions include a factor informing the respective controllers an extent to which the respective identified techniques are to be applied.

15. A system for orchestrating control actions of controllers, the system comprising:
- an application platform controller;
- a core network controller;
- an access network controller; and
- a synergy profiler, wherein the synergy profiler, the application platform controller, the core network controller and the access network controller are connected to each other by an Information Technology (IT) and network, the synergy profiler including one or more computational processors, which alone or in combination, are configured to orchestrate control actions of controllers by:
    - receiving, from the application platform controller, requirements of an application;
    - receiving, from each of the controllers, respective techniques of the respective controller, respective impacts of use of the respective techniques on the requirements and triggers addressable by the respective techniques, the triggers having information about situations or events that result in at least one of the requirements being endangered;
    - generating an initial synergy profile using the respective techniques, the respective impacts of the use of the respective techniques and the triggers received from the controllers;
    - running, in regular intervals or based on activation of one or more of the triggers, a handling procedure which considers the respective techniques of each of the different controllers and the respective impacts of the use of the respective techniques to identify which ones of the techniques are to implemented to address one or more of the requirements that are indicated by the information of an activated one of the triggers as being endangered;
    - sending instructions, to the respective controllers to which the techniques identified by the handling procedure belong, to implement the respective identified techniques; and
    - updating the synergy profile based on changes resulting from the application of the techniques by the respective controllers, and
- wherein the controllers comprise one or more computational processors which are configured to implement the techniques that are identified in the instructions sent from the synergy profiler.

* * * * *